United States Patent
Kim et al.

(10) Patent No.: US 8,558,412 B2
(45) Date of Patent: Oct. 15, 2013

(54) WIRELESS POWER TRANSMITTER, WIRELESS POWER RECEIVER, AND METHOD FOR WIRELESS POWER TRANSFER USING THEM

(75) Inventors: Yong Hae Kim, Daejeon (KR); Seung Youl Kang, Daejeon (KR); Sang Hoon Cheon, Daejeon (KR); Myung Lae Lee, Daejeon (KR); Tae Hyoung Zyung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 502 days.

(21) Appl. No.: 12/897,673

(22) Filed: Oct. 4, 2010

(65) Prior Publication Data

US 2012/0025622 A1 Feb. 2, 2012

(30) Foreign Application Priority Data

Jul. 29, 2010 (KR) .......................... 10-2010-0073379

(51) Int. Cl.
*H01F 27/42* (2006.01)
(52) U.S. Cl.
USPC ........................................................ 307/104
(58) Field of Classification Search
USPC ........................................................ 307/104
See application file for complete search history.

(56) References Cited

U.S. PATENT DOCUMENTS

| | | | | |
|---|---|---|---|---|
| 6,650,227 | B1* | 11/2003 | Bradin | 340/10.3 |
| 2010/0277003 | A1* | 11/2010 | Von Novak et al. | 307/104 |
| 2011/0198937 | A1* | 8/2011 | Tseng | 307/104 |
| 2012/0001485 | A1* | 1/2012 | Uchida | 307/11 |
| 2012/0001492 | A9* | 1/2012 | Cook et al. | 307/104 |

FOREIGN PATENT DOCUMENTS

| KR | 10-0806562 A | 2/2008 |
|---|---|---|
| KR | 2010-0052565 A | 5/2010 |
| KR | 2010-0082030 A | 7/2010 |

OTHER PUBLICATIONS

André Kurs et al., "Wireless Power Transfer via Strongly Coupled Magnetic Resonances", Science, vol. 317, pp. 83-86 (2007).

* cited by examiner

*Primary Examiner* — Robert L. Deberadinis
(74) *Attorney, Agent, or Firm* — Rabin & Berdo, P.C.

(57) ABSTRACT

Provided is a method for a wireless power transfer. The method includes modulating a transmission frequency according to a predetermined value at a wireless power transmitter; and transmitting a high frequency signal according to the modulated transmission signal from the wireless power transmitter to at least one wireless power receiver and redetermining the predetermined value according to information which corresponds to a power value of the high frequency signal received by the at least one wireless power receiver, wherein the modulating the transmission frequency at the wireless power transmitter and transmitting the high frequency and the redetermining the predetermined value the at least one wireless power receiver are repeated.

19 Claims, 8 Drawing Sheets

WIRELESS POWER TRANSMITTER, WIRELESS POWER RECEIVER, AND METHOD FOR WIRELESS POWER TRANSFER USING THEM

CROSS-REFERENCE TO RELATED APPLICATIONS

This U.S. non-provisional patent application claims priority under 35 U.S.C. §119 of Korean Patent Application No. 10-2010-0073379, filed on Jul. 29, 2010, the entire contents of which are hereby incorporated by reference.

BACKGROUND OF THE INVENTION

The present invention disclosed herein relates to a wireless electric power transmitter, a wireless electric power receiver and a method of wireless electric power transfer using the same.

Recently, performance and kinds of electronic devices have been remarkably improved and increased. Particularly, thanks to the remarkable development of the semiconductor and display technologies, portable electronic devices have been made smaller and smaller. However, one of shortcomings of the electronic devices is that they should be supplied with power through a wire. A charger may be used; however, the electronic devices should be supplied with electric power through a wire again due to limitation of charge capacity after they are used for a certain period of time. For overcoming this shortcoming, a technology for charging wirelessly has been developed. For instance, Radio Frequency (RF) or magnetic induction is used.

Particularly, the magnetic induction technology has been commercialized for manufacturing a shaver by Philips. In the case of supplying power wirelessly, since there is no possibility of a short circuit caused by water, the electronic devices may be safely used. Further, since burdensome wires are not needed, the wireless power supply helps to improve the appearance of the electronic devices. However, an effective range of the magnetic induction is extremely short causing various incommodities. For overcoming this limitation, the RF or resonant power transfer technology has been used.

SUMMARY OF THE INVENTION

The present invention provides a wireless power transmitter and a wireless power receiver for transferring power according to an optimum transmission frequency, and a method for a wireless power transfer using them.

The present invention also provides a wireless power transmitter and a wireless power receiver capable of reducing charge time, and a method for a wireless power transfer using them.

Embodiments of the present invention provide methods for a wireless power transfer including modulating a transmission frequency according to a predetermined value at a wireless power transmitter; and transmitting a high frequency signal according to the modulated transmission signal from the wireless power transmitter to at least one wireless power receiver and redetermining the predetermined value according to information which corresponds to a power value of the high frequency signal received by the at least one wireless power receiver, wherein the modulating the transmission frequency at the wireless power transmitter and transmitting the high frequency and the redetermining the predetermined value the at least one wireless power receiver are repeated.

In some embodiments, the transmission frequency is modulated within approximately 10% of an independent resonance frequency.

In other embodiments, the information about the power value is included in a feedback signal generated by the at least one wireless power receiver.

In still other embodiments, the feedback signal is generated by an amplitude modulation method.

In even other embodiments, operations are repeatedly performed at the at least one wireless power transmitter, the operations including transmitting the feedback signal; and generating a direct current power by using the transmitted high frequency signal and driving a load by using the generated direct current power.

In yet other embodiments, the transmitting the feedback signal and the modulating the transmission frequency are simultaneously performed.

In further embodiments, the generating the direct current power and driving the load is performed at the same time as the determining the transmission frequency and generating the high frequency signal.

In still further embodiments, the transmission frequency is modulated according to the number of wireless power receivers.

In even further embodiments, the transmission frequency is modulated according to positions of wireless power receivers.

In other embodiments of the present invention, wireless power transmitters include a power generation unit configured to receive an alternating current power and generate a high frequency direct current power; a frequency modulation unit configured to determine and modulate a transmission frequency of the high frequency direct current power based on a feedback signal received from at least one wireless power receiver; and a transmission coil unit configured to transmit the high frequency direct current power as a non-radiative electromagnetic wave.

In some embodiments, the feedback signal includes information which corresponds to a power value inputted to the at least one wireless power receiver.

In other embodiments, the transmission coil unit includes a power coil where a current corresponding to the high frequency direct current power flows; and a transmission coil configured to magnetically induce the current flown through the power coil and generate the non-radiative electromagnetic wave when a resonance frequency is the same as the at least one wireless power receiver.

In still other embodiments, an output time adjustment unit configured to vary a power quantity transmitted when the frequency modulation unit determines the transmission frequency and a power quantity transmitted after the frequency modulation unit determines the transmission frequency is further included.

In even other embodiments, the output time adjustment unit transfers the power by a Pulse Width Modulation (PWM) method.

In still other embodiments of the present invention, wireless power receivers include a reception coil unit configured to receive a high frequency signal; a power generation unit configured to generate a direct current power by using an alternating current power received by the reception coil unit; a load unit configured to be driven by the generated direct current power; and a feedback signal generation unit configured to generate a feedback signal which corresponds to a power value of the received high frequency signal, wherein the high frequency signal has a transmission frequency modulated according to the feedback signal.

In some embodiments, the high frequency signal is a non-radiative electromagnetic wave.

In other embodiments, the reception coil unit includes a reception coil through which a high frequency current is flown by receiving the high frequency signal; and a load coil configured to be magnetically induced according to the high frequency current flow of the reception coil.

In still other embodiments, the feedback signal generation unit generates the feedback signal by an amplitude modulation method.

In even other embodiments, the feedback signal is a digital signal which corresponds to the power value.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

Figure 1:
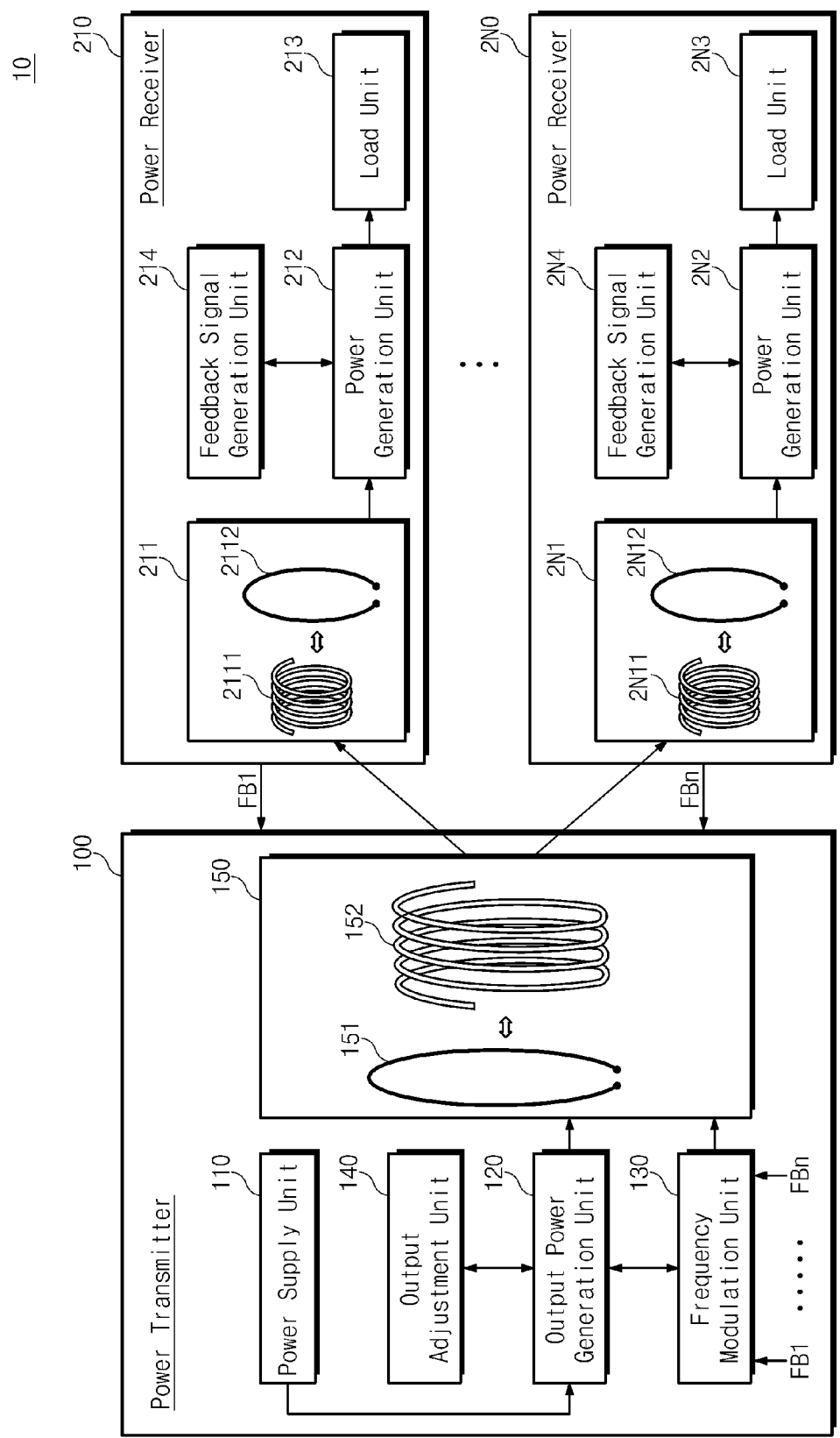
FIG. 1 is a block diagram illustrating a wireless power transfer system according to an embodiment of the present invention.

FIG. 1 is a block diagram illustrating a wireless power transfer system 10 according to an embodiment of the present invention. Referring to FIG. 1, the wireless power transfer system 10 includes a wireless power transmitter 100 and wireless power receivers 210 to 2N0, where N is a natural number.

For the embodiment, the wireless power transfer system 10 may transfer power according to a non-radiative wireless power transfer technology. According to the non-radiative wireless power transfer technology, the power may be transferred from a farther distance and with higher efficiency in comparison with a typical electromagnetic induction and an electromagnetic radiation respectively. Herein, the non-radiative wireless power transfer technology is based on evanescent wave coupling by which an electromagnetic wave is transferred from one medium to another through a near electromagnetic field when the two media resonate at the same frequency. At this time, only when the resonance frequencies between the two media are the same, the power is transferred, and unused power is reabsorbed into an electromagnetic field not being radiated into air. Therefore, the electromagnetic field used for the non-radiative wireless power transfer technology is harmless to a surrounding machine or a human body unlike other electromagnetic fields.

The wireless power transmitter 100 includes a power supply unit 110, an output power generation unit 120, a frequency modulation unit 130, an output time adjustment unit 140 and a transmission coil unit 150.

The power supply unit 110 receives power from an AC plug. The received power is an alternating current power. For instance, the power inputted to the power supply unit 110 may be 220 V/60 Hz or 110 V/60 Hz.

The output power generation unit 120 generates a high frequency signal by converting power provided by the power supply unit 110 into a high frequency. For the embodiment, the output power generation unit 120 may be embodied as an inverter form or an amplifier form for generating a high frequency signal ranging from about 1 MHz to about 15 MHz. For another embodiment, the output power generation unit 120 may generate a high frequency signal ranging from about 1 MHz to about 21 MHz by using a vector network analyzer.

The frequency modulation unit 130 determines an optimum transmission frequency by using feedback signals FB1 to FBn received from the wireless power receivers 210 to 2N0 and modulates a transmission frequency of an output signal. Herein, the feedback signals FB1 to FBn include information which corresponds to a value of the received power. For the embodiment, the frequency modulation unit 130 may modulate the frequency within approximately 10% of an independent resonance frequency. Herein, the independent resonance frequency raises a resonance between the wireless power transmitter 100 and the wireless power receivers 210 to 2N0 for the wireless power transfer. If the independent frequency is about 9.6 MHz, the optimum frequency may be about 8.7 MHz to 9.7 MHz.

The output time adjustment unit 140 adjusts output time of a high frequency signal which is outputted from the wireless power transmitter 100. For instance, when the wireless power transmitter 100 searches for the optimum frequency, the output time adjustment unit 140 controls the high frequency to be outputted only during short time. On the contrary, after the wireless power transmitter 100 determines the optimum frequency, the output time adjustment unit 140 controls the high frequency to be outputted most of the time.

The transmission coil unit 150 transfers the high frequency signal generated by the output power generation unit 120 to reception coil units 211 to 2N1. The transmission coil unit 150 includes a power coil 151 and a transmission coil 152.

The power coil 151 receives a high frequency current which corresponds to the high frequency signal generated by the output power generation unit 120. A coil whose diameter is more than or equal to about 3 mm may be used for the power coil 151 in order to reduce loss due to resistance. Although a number of turns of the power coil 151 illustrated in FIG. 1 is 1, the number of turns of the power coil of the present invention is not limited to this example.

The transmission coil 152 induces the high frequency current of the power coil 151 by magnetic induction and generates the high frequency, i.e., a non-radiative electromagnetic wave towards the wireless power receivers 210 to 2N0. A coil whose diameter is more than or equal to about 3 mm may be used for the transmission coil 152 in order to reduce loss due to resistance. The number and interval of turns of the transmission coil 152 are adjusted to be right for a target resonance frequency. Since the transmission coil 152 performs the power transfer according to the magnetic induction, the transmission coil 152 is positioned as close as possible to the power coil 151. The transmission coil 152 may be embodied as a helical structure as illustrated in FIG. 1.

The wireless power receivers 210 to 2N0 are devices for wirelessly receiving the power from the wireless power transmitter 100. That is, the wireless power receivers 210 to 2N0 receive the high frequency signal which includes the power from the wireless power transmitter 100. For the embodiment, the wireless power receivers 210 to 2N0 are designed to receive the power transferred through the non-radiative electromagnetic wave.

The wireless power receivers 210 to 2N0 may be various electronic devices such as a mobile phone and a portable computer. Meanwhile, these electronic devices are provided with a battery which is charged by the power received through the non-radiative electromagnetic wave.

The wireless power receiver 210 includes the reception coil unit 211, a power generation unit 212, a load unit 213 and a feedback signal generation unit 214.

The reception coil unit 211 includes a reception coil 2111 and a load coil 2112.

The reception coil 2111 receives the high frequency signal from the transmission coil 152. For the embodiment, the reception coil 2111 may have a spiral structure.

The load coil 2112 induces the high frequency current from the reception coil 2111 by the magnetic induction. Since the power transfer is performed by the magnetic induction, the load coil 2112 is positioned as close as possible to the reception coil 2111.

The power generation unit 212 receives the high frequency current from the load coil 2112 and generates a direct current power. The generated direct current power may be used for charging a battery (not shown) of the wireless power receiver 210.

The load unit 213 uses the generated direct current power.

The feedback signal generation unit 214 generates the feedback signal FB1 which corresponds to a value of the received power. The feedback signal generation unit 214 may be embodied as a passive type Radio Frequency Identification (RFID).

The wireless power receiver 2N0 includes the reception coil unit 2N1, a power generation unit 2N2, a load unit 2N3 and a feedback signal generation unit 2N4 which respectively have the same operations and structures as the reception coil unit 211, the power generation unit 212, the load unit 213 and the feedback signal generation unit 214 included in the wireless power receiver 210.

According to the typical resonant wireless power transfer method, the resonance frequency should be adjusted for improving power transfer efficiency. However, one of shortcomings of this method is that the resonance frequency is changed according to the number and position of the wireless power receivers.

On the contrary, the wireless power transfer system 10 according to the present invention determines the optimum transmission frequency for the power transfer based on the feedback signal FB1 to FBn received in real time from the wireless power receivers, and the high frequency signal modulated as the determined optimum transmission frequency is transferred. Accordingly, the wireless power transfer system 10 according to the present invention can efficiently perform the power transfer reducing charging time of the wireless power receivers 210 to 2N0. That is, since the wireless power transfer system 10 according to the present invention simultaneously charges the plurality of wireless power receivers 210 to 2N0, the charging time can be dramatically reduced in comparison with charging a single wireless power receiver.

Figure 2:
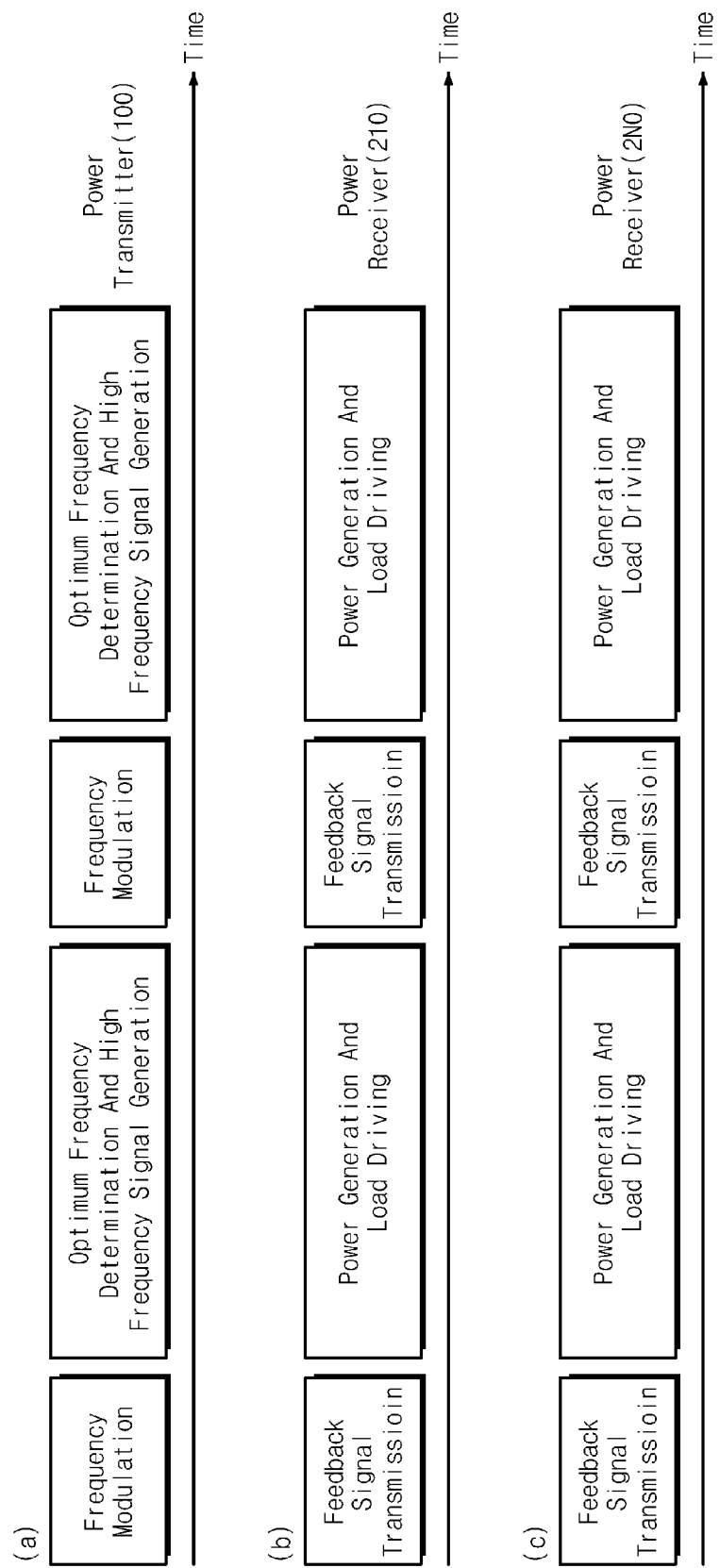
FIG. 2 is a diagram illustrating an exemplary method for the wireless power transfer in the wireless power transfer system illustrated in FIG. 1.

FIG. 2 is a diagram illustrating an exemplary method for the wireless power transfer in the wireless power transfer system 10 illustrated in FIG. 1.

FIG. 2A is a schematic diagram illustrating the wireless power transfer method performed by the wireless power transmitter 100. Referring to FIG. 2A, according to the wireless power transfer method performed by the wireless power transmitter 100, an operation of modulating the frequency and an operation of determining the optimum frequency and transmitting the high frequency are repeatedly performed.

In the operation of modulating the frequency, the frequency modulation unit 130 modulates the transmission frequency according to a prescribed value. Herein, the prescribed value may be determined in order to maximally transfer the power or have been previously determined already.

In the operation of determining the optimum frequency and transmitting the high frequency, the frequency modulation unit 130 determines the optimum transmission frequency by using the feedback signals FB1 to FBn received from the wireless power receivers 210 to 2N0, and the transmission coil unit 150 transmits the non-radiative high frequency to the wireless power receivers 210 to 2N0 with the modulated transmission frequency. Herein, the optimum transmission frequency may be a frequency for maximally transferring the power to the wireless power receivers 210 to 2N0. Also, the determining the optimum frequency is redetermining the prescribed value in the operation of modulating the frequency.

The above-mentioned wireless power transfer method can improve the power transfer efficiency by modulating the transmission frequency in real time.

FIG. 2B is a diagram illustrating the wireless power transfer method performed by the wireless power receiver 210, and FIG. 2C is a diagram illustrating the wireless power transfer method performed by the wireless power receiver 2N0.

Referring to FIGS. 2B and 2C, according to the wireless power transfer method performed by the wireless power receivers 210 and 2N0, an operation of transmitting the feedback signal and an operation of generating the power and driving a load are repeatedly performed.

In the operation of transmitting the feedback signal, the feedback signal generation units 210 and 2N0 respectively transmit the feedback signals FB1 and FBn corresponding to the power value of the received high frequency signal to the wireless power transmitter 100. Herein, the feedback signals FB1 and FBn may be digital signals having data which correspond to the power value.

In the operation of generating the power and driving the load, each of the power generation units 212 and 2N2 generates the direct current power which corresponds to the received high frequency signal, and the load units 213 and 2N3 are driven by the generated direct current power. Herein, the load units 213 and 2N3 may be batteries.

According to the power reception method of the present invention, the feedback signals FB1 and FBn which correspond to the power value are transferred to the wireless power transmitter 100 in real time, and thus it is advantageous for the optimum power transfer.

For the embodiment, the operation of modulating the frequency performed by the wireless power transmitter 100 and the operation of transmitting the feedback signal performed by the wireless power receivers 210 and 2N0 may be simultaneously performed.

For the embodiment, the operation of determining the optimum frequency and transmitting the high frequency performed by the wireless power transmitter 100 and the operation of generating the power and driving the load performed by the wireless power receivers 210 and 2N0 may be simultaneously performed.

As above-mentioned, according to the power transfer method of the present invention, the optimum frequency is determined in real time, and the high frequency which is suitable for the determined frequency is transmitted. Therefore, the power transfer can be more efficiently performed.

The wireless power transfer system 10 according to the present invention may change a power transfer quantity according to conditions. For instance, the power transfer quantity may be reduced while the wireless power transmitter 100 searches for the optimum frequency. On the contrary, the power transfer quantity may be increased after the wireless power transmitter 100 determines the optimum frequency.

Figure 3:
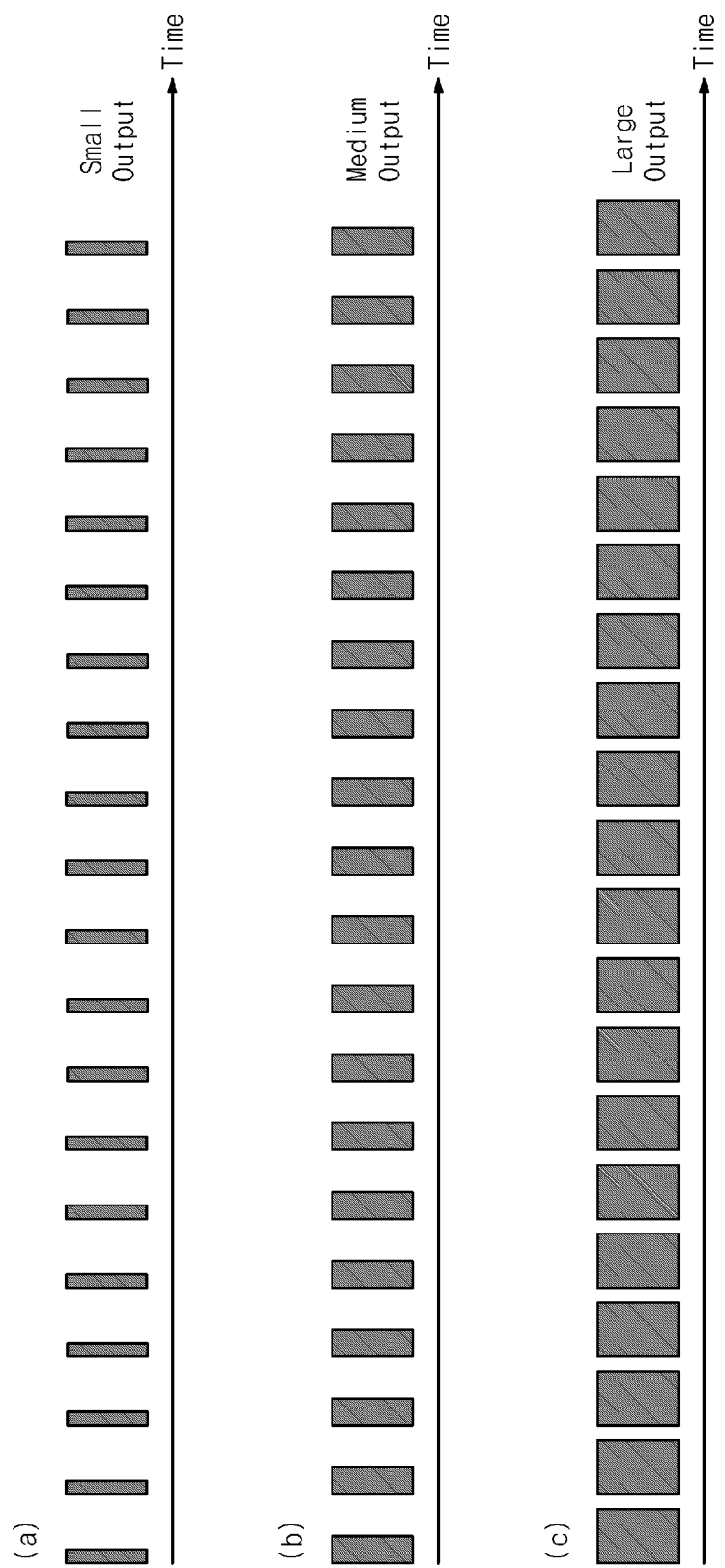
FIG. 3 is a diagram exemplarily illustrating the adjustment of the power transfer quantity in the output time adjustment unit included in the wireless power transmitter illustrated in FIG. 1.

FIG. 3 is a diagram exemplarily illustrating the adjustment of the power transfer quantity in the output time adjustment unit 140 included in the wireless power transmitter 100. FIGS. 3A to 3C respectively illustrate the power transfer in the case of a small output, a medium output and a large output. For the embodiment, the power transfer of the small output may be used in the operation of modulating the frequency, and the power transfer of the large output may be used in the operation of transmitting the high frequency.

Referring to FIGS. 3A to 3C, according to the wireless power transfer method of the present invention, the power is transferred using a Pulse Width Modulation (PWM) method. At this time, the frequency is constantly maintained, and the power transfer quantity is adjusted by varying a width.

For another embodiment, the wireless power transmitter 100 may adjust an output of whole power according to conditions. In this case, the width is constantly maintained.

Figure 4:
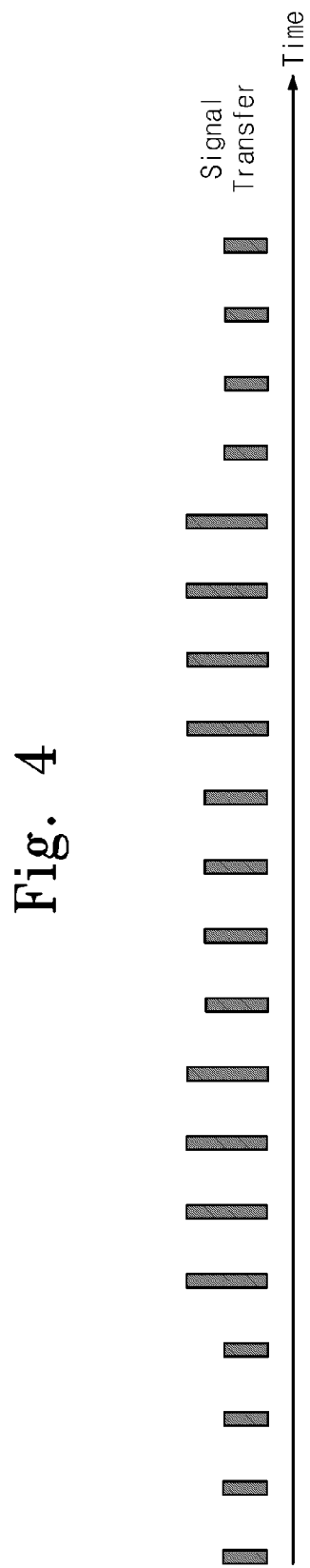
FIG. 4 is a diagram exemplarily illustrating the feedback signal generated by the feedback signal generation unit included in the wireless power receiver illustrated in FIG. 1.

FIG. 4 is a diagram exemplarily illustrating the feedback signals FB1 to FBn generated by the feedback signal generation units 214 to 2N4 included in the wireless power receivers 210 to 2N0 illustrated in FIG. 1. Referring to FIG. 4, each of the feedback signals FB1 to FBn is a digital signal which corresponds to the power value. Herein, frequencies of the feedback signals FB1 to FBn are much slower than that of the received high frequency signal. For reference, the wireless power transmitter 100 decodes the received feedback signals FB1 to FBn in order to determine the received power value.

For the embodiment, an amplitude modulation method may be used for the signal generation of the wireless power receiver. It is all right that the feedback signal transferred from the wireless power receiver is small. Therefore, the feedback signal is transferred by a small output method and the amplitude modulation method. The amplitude modulation method does not cause a problem for the power transfer because the frequency remains constant. The feedback signals transferred from the wireless power receiver in this manner are demodulated by the frequency modulation unit 130 and used as information for searching for the optimum frequency.

Figure 5:
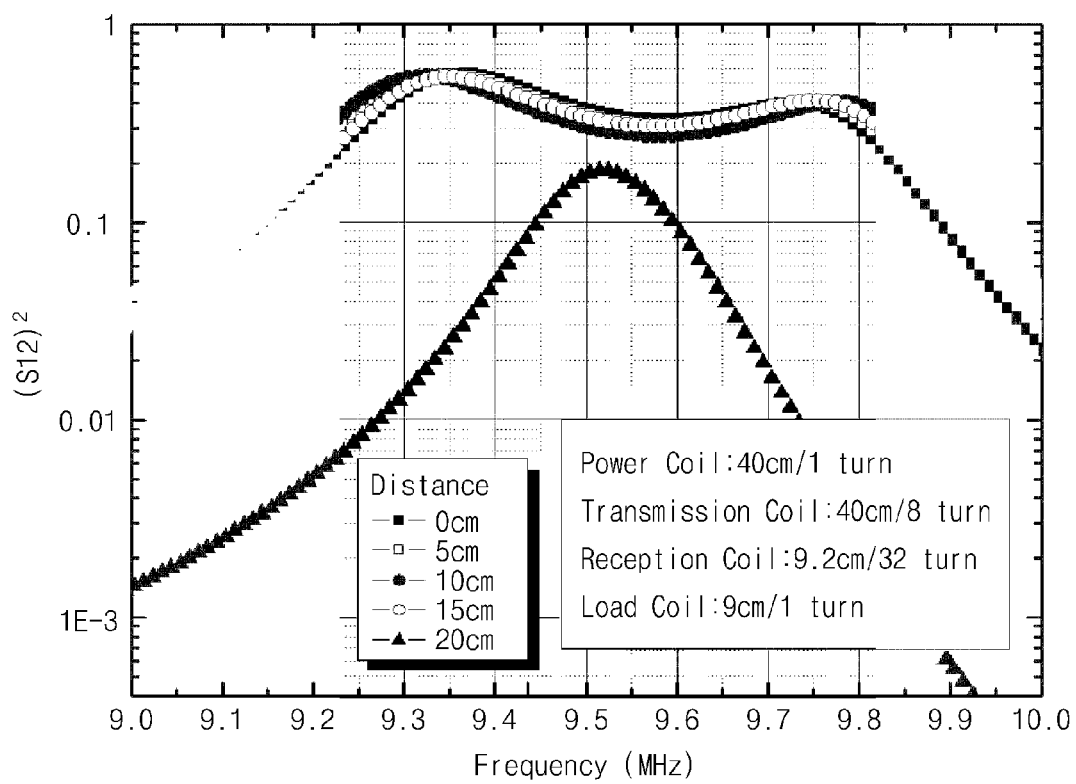
FIG. 5 is a diagram for explaining power transfer properties when the number of the wireless power receivers in the wireless power transfer system illustrated in FIG. 1 is one.
Figure 6:
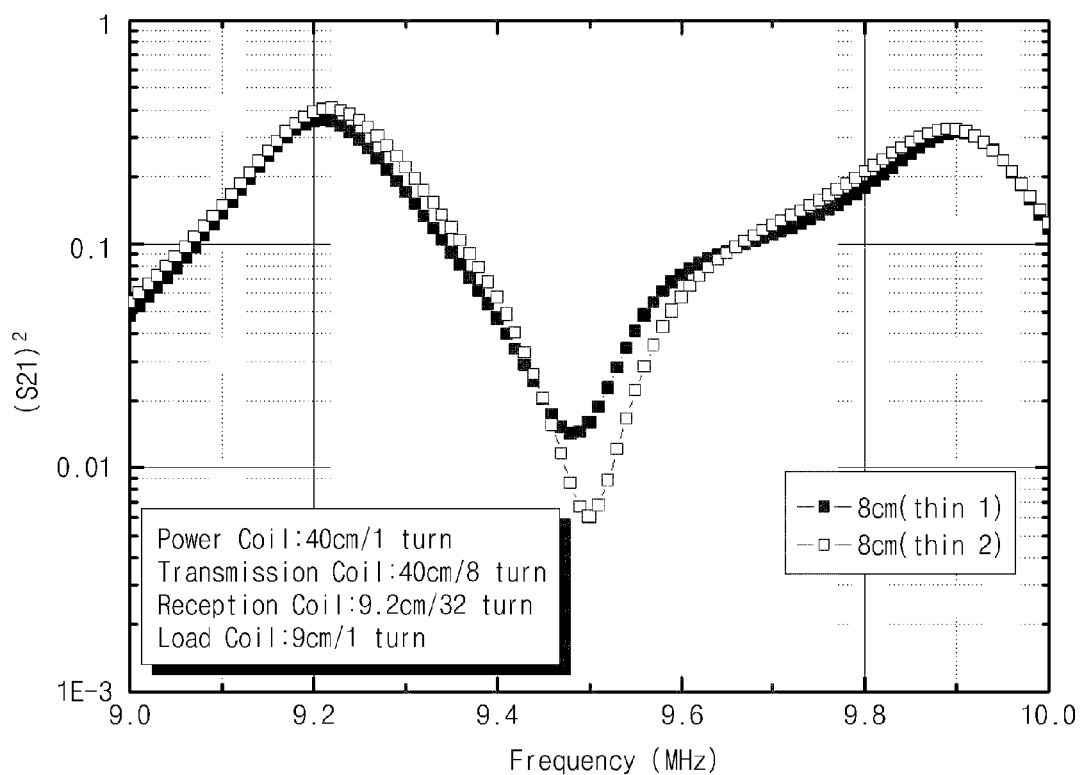
FIG. 6 is a diagram for explaining the power transfer properties when two wireless power receivers are far away from each other in the wireless power transfer system illustrated in FIG. 1.
Figure 7:
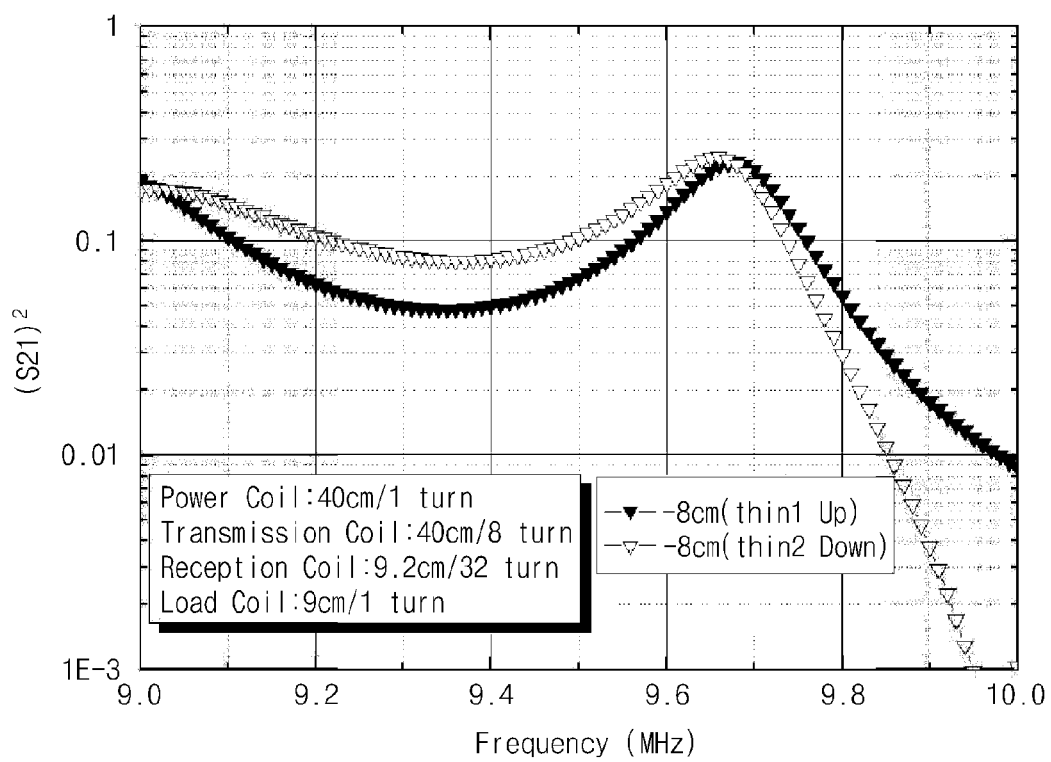
FIG. 7 is a diagram for explaining the power transfer properties when two wireless power receivers are close to each other in the wireless power transfer system illustrated in FIG. 1.

Meanwhile, the wireless power transfer system 10 according to the present invention may determine the optimum frequency according to the number and position of the wireless power receivers. Referring to FIGS. 5 to 7, the frequency for the optimum power transfer according to the number and position of the wireless power receivers will be explained.

FIG. 5 is a diagram for explaining power transfer properties when the number of the wireless power receivers in the wireless power transfer system 10 illustrated in FIG. 1 is one. It is assumed that the coil unit of the wireless power transfer system 10 includes a thin film and a spiral coil, the power coil 151 is about 40 cm/1 turn, the transmission coil 152 is about 40 cm/8 turn, the reception coil 2111 is about 9.2 cm/32 turn, and the load coil 2112 is about 9 cm/1 turn.

Referring to FIG. 5, when one wireless power receiver 210 is about 20 cm away from the wireless power transmitter 100, the power transfer is maximized at a frequency of about 9.34 MHz. Therefore, the wireless power transmitter 100 should transmit the power as a signal of about 9.34 MHz.

FIG. 6 is a diagram for explaining the power transfer properties when two wireless power receivers are far away from each other in the wireless power transfer system 10 illustrated in FIG. 1. It is assumed that the coil unit of the wireless power transfer system 10 includes the thin film and the spiral coil, the power coil 151 is about 40 cm/1 turn, the transmission coil 152 is about 40 cm/8 turn, the reception coils 2111 and 2N11 are about 9.2 cm/32 turn, and the load coils 2112 and 2N12 are about 9 cm/1 turn. It is assumed that the wireless power receivers 210 and 2N0 are about 8 cm away from the wireless power transmitter 100, and they are also far away from each other.

Referring to FIG. 6, when the two wireless power receivers 210 and 2N0 are far away from each other, the power transfer is maximized at a frequency of about 9.2 MHz. Therefore, the wireless power transmitter 100 should transmit the power as a signal of about 9.2 MHz.

FIG. 7 is a diagram for explaining the power transfer properties when two wireless power receivers are close to each other. It is assumed that the coil unit of the wireless power transfer system 10 includes the thin film and the spiral coil, the power coil 151 is about 40 cm/1 turn, the transmission coil 152 is about 40 cm/8 turn, the reception coils 2111 and 2N11 are about 9.2 cm/32 turn, and the load coils 2112 and 2N12 are about 9 cm/1 turn. It is also assumed that the wireless power receivers 210 and 2N0 are about 8 cm away from the wireless power transmitter 100, and the wireless power receiver 210 is positioned right on the wireless power receiver 2N0.

Referring to FIG. 7, when the two wireless power receivers 210 and 2N0 are stacked, the power transfer is maximized at a frequency of about 9.65 MHz. Therefore, the wireless power transmitter 100 should transmit the power as a signal of about 9.65 MHz.

It is possible to apply the wireless power transfer system according to the present invention to a wireless communication system.

Figure 8:
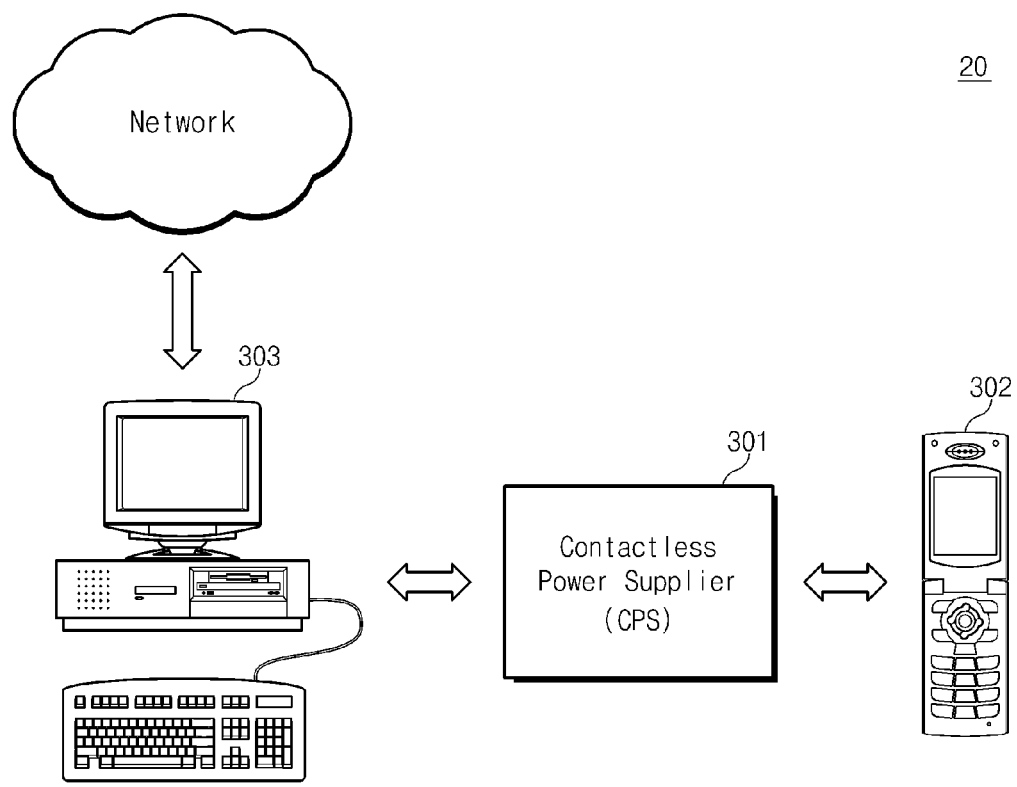
FIG. 8 is a diagram exemplarily illustrating a communication system applied by the wireless power transfer system according to the present invention.

FIG. 8 is a diagram exemplarily illustrating a communication system 20 applied by the wireless power transfer system according to the present invention. Referring to FIG. 8, the communication system 20 includes a contactless power supply device 301, a terminal device 302 and a workstation 303 connected to a network.

The contactless power supply device 301 is connected to the workstation and has the same operation and structure as the wireless power transmitter 100 illustrated in FIG. 1. The contactless power supply device 301 may establish a communication link between the terminal device 302 and the workstation 303. Herein, the communication link is used for transferring data from/to the terminal device 302. The terminal device 302 has the same operation and structure as the wireless power receiver 210 illustrated in FIG. 1.

As above-described, the wireless power transfer system according to the present invention improves the power transfer efficiency by determining the optimum transmission frequency according to the value of the received power.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for a wireless power transfer, comprising:
   modulating a transmission frequency according to a predetermined value at a wireless power transmitter; and
   transmitting a high frequency signal according to the modulated transmission frequency from the wireless power transmitter to at least one wireless power receiver and redetermining the predetermined value according to information which corresponds to a power value of the high frequency signal received by the at least one wireless power receiver,
   wherein the modulating the transmission frequency at the wireless power transmitter and transmitting the high frequency and the redetermining the predetermined value the at least one wireless power receiver are repeated.

2. The method of claim 1, wherein the transmission frequency is modulated within approximately 10% of an independent resonance frequency.

3. The method of claim 1, wherein the information about the power value is included in a feedback signal generated by the at least one wireless power receiver.

4. The method of claim 3, the feedback signal is generated by an amplitude modulation method.

5. The method of claim 4, wherein operations are repeatedly performed at the at least one wireless power transmitter, the operations comprising:
   transmitting the feedback signal; and generating a direct current power by using the transmitted high frequency signal and driving a load by using the generated direct current power.

6. The method of claim 5, wherein the transmitting the feedback signal and the modulating the transmission frequency are simultaneously performed.

7. The method of claim 6, wherein the generating the direct current power and driving the load is performed at the same time as the determining the transmission frequency and generating the high frequency signal.

8. The method of claim 7, wherein the transmission frequency is modulated according to the number of wireless power receivers.

9. The method of claim 7, wherein the transmission frequency is modulated according to positions of wireless power receivers.

10. A wireless power transmitter, comprising:
    a power generation unit configured to receive an alternating current power and generate a high frequency direct current power;
    a frequency modulation unit configured to determine and modulate a transmission frequency of the high frequency direct current power based on a feedback signal received from at least one wireless power receiver; and
    a transmission coil unit configured to transmit the high frequency direct current power as a non-radiative electromagnetic wave.

11. The wireless power transmitter of claim 10, wherein the feedback signal includes information which corresponds to a power value inputted to the at least one wireless power receiver.

12. The wireless power transmitter of claim 10, wherein the transmission coil unit comprises:
    a power coil where a current corresponding to the high frequency direct current power flows; and
    a transmission coil configured to magnetically induce the current flown through the power coil and generate the non-radiative electromagnetic wave when a resonance frequency is the same as the at least one wireless power receiver.

13. The wireless power transmitter of claim 10, further comprising an output time adjustment unit configured to vary a power quantity transmitted when the frequency modulation unit determines the transmission frequency and a power quantity transmitted after the frequency modulation unit determines the transmission frequency.

14. The wireless power transmitter of claim 13, wherein the output time adjustment unit transfers the power by a Pulse Width Modulation (PWM) method.

15. A wireless power receiver, comprising:
    a reception coil unit configured to receive a high frequency signal;
    a power generation unit configured to generate a direct current power by using an alternating current power received by the reception coil unit;
    a load unit configured to be driven by the generated direct current power; and a feedback signal generation unit configured to generate a feedback signal which corresponds to a power value of the received high frequency signal,
    wherein the high frequency signal has a transmission frequency modulated according to the feedback signal.

16. The wireless power receiver of claim 15, wherein the high frequency signal is a non-radiative electromagnetic wave.

17. The wireless power receiver of claim 16, wherein the reception coil unit comprises:
    a reception coil through which a high frequency current is flown by receiving the high frequency signal; and
    a load coil configured to be magnetically induced according to the high frequency current flow of the reception coil.

18. The wireless power receiver of claim 17, wherein the feedback signal generation unit generates the feedback signal by an amplitude modulation method.

19. The wireless power receiver of claim 18, wherein the feedback signal is a digital signal which corresponds to the power value.

* * * * *